United States Patent
Borkowski

(10) Patent No.: US 11,242,003 B2
(45) Date of Patent: Feb. 8, 2022

(54) SYSTEM COMPRISING CONSTRUCTION MACHINE, TRANSPORT VEHICLE WITH LOADING SPACE AND IMAGE-RECORDING DEVICE, AND METHOD FOR DISPLAYING AN IMAGE STREAM DURING THE LOADING OR UNLOADING OF A TRANSPORT VEHICLE

(71) Applicant: Wirtgen GmbH, Windhagen (DE)

(72) Inventor: Helmut Borkowski, Langerwehe (DE)

(73) Assignee: Wirtgen GmbH

( * ) Notice: Subject to any disclaimer, the term of this patent is extended or adjusted under 35 U.S.C. 154(b) by 770 days.

(21) Appl. No.: 16/070,834

(22) PCT Filed: Jan. 23, 2017

(86) PCT No.: PCT/EP2017/051340
§ 371 (c)(1),
(2) Date: Jul. 18, 2018

(87) PCT Pub. No.: WO2017/125607
PCT Pub. Date: Jul. 27, 2017

(65) Prior Publication Data
US 2019/0061623 A1 Feb. 28, 2019

(30) Foreign Application Priority Data

Jan. 21, 2016 (DE) .................. 10 2016 000 535.1
May 27, 2016 (DE) .................. 10 2016 006 303.3

(51) Int. Cl.
*B60R 1/00* (2006.01)
*B65G 67/22* (2006.01)
(Continued)

(52) U.S. Cl.
CPC ................ *B60R 1/00* (2013.01); *B65G 67/22* (2013.01); *E01C 23/088* (2013.01);
(Continued)

(58) Field of Classification Search
CPC . B60R 1/00; B60R 2300/105; B60R 2300/50; B60R 2300/80; G05D 1/0293;
(Continued)

(56) References Cited

U.S. PATENT DOCUMENTS 8,528,988 B2  9/2013  Von Schnebeck et al.
9,562,334 B2  2/2017  Von der Lippe et al.
(Continued)

FOREIGN PATENT DOCUMENTS

DE        9402324 U1    7/1995
DE    202012003513 U1    7/2012
(Continued)

OTHER PUBLICATIONS

Search report and written opinion in corresponding PCT/EP2017/051340 (not prior art).
(Continued)

*Primary Examiner* — James M Pontius
(74) *Attorney, Agent, or Firm* — Lucian Wayne Beavers; Gary L. Montle; Patterson Intellectual Property Law, PC

(57) ABSTRACT

In a system (1) comprising construction machine (2), transport vehicle (3) with loading space (4) and image-recording device (5, 36), wherein the image-recording device (5, 36) is arranged at the construction machine (2) and aligned, as a minimum, also towards the loading space (4) of the transport vehicle (3), it is specified for the following features to be achieved: that a reception and display device (18) is arranged at or in the transport vehicle (3), wherein the data recorded by the image-recording device (5, 36) are transmitted to the reception and display device (18) by means of a transmission device (46) arranged at the construction machine (2).

39 Claims, 3 Drawing Sheets

Figure 1:
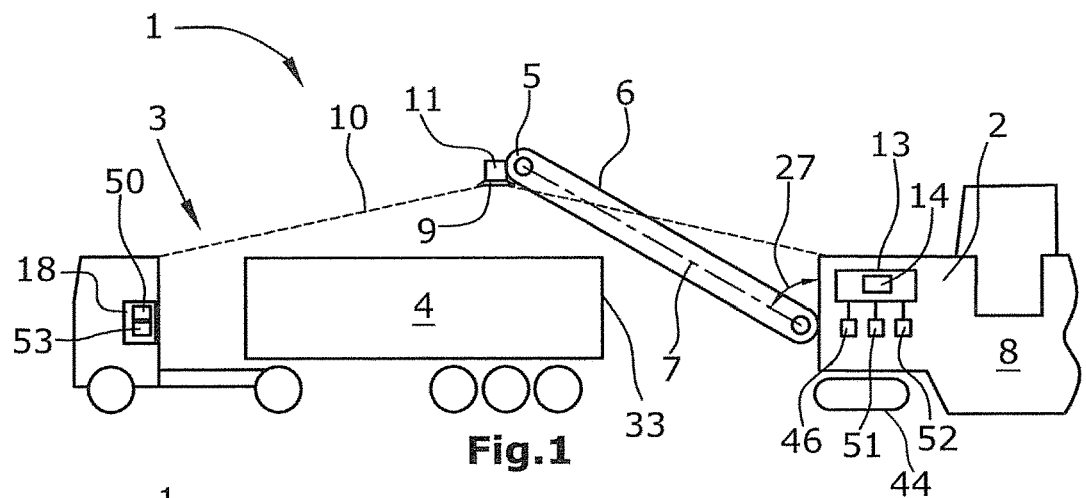

(51) Int. Cl.
*G05D 1/02* (2020.01)
*E01C 23/088* (2006.01)
*G08G 1/16* (2006.01)
*H04N 7/18* (2006.01)

(52) U.S. Cl.
CPC ......... *G05D 1/0246* (2013.01); *G05D 1/0293* (2013.01); *G08G 1/163* (2013.01); *H04N 7/181* (2013.01); *H04N 7/183* (2013.01); *B60R 2300/105* (2013.01); *B60R 2300/50* (2013.01); *B60R 2300/80* (2013.01); *B65G 2203/041* (2013.01); *G05D 2201/0202* (2013.01)

(58) Field of Classification Search
CPC .......... G05D 1/0246; G05D 2201/0202; E01C 23/088; G08G 1/163; H04N 7/181; H04N 7/183; B65G 67/22; B65G 2203/041
See application file for complete search history.

(56) References Cited

U.S. PATENT DOCUMENTS

| | | |
|---|---|---|
| 9,764,910 B2 | 9/2017 | Berning et al. |
| 9,809,937 B2 | 11/2017 | Berning et al. |
| 9,873,993 B2 | 1/2018 | Berning et al. |
| 9,915,043 B2 | 3/2018 | Berning et al. |
| 10,100,470 B2 | 10/2018 | Berning et al. |
| 10,100,471 B2 | 10/2018 | Berning et al. |
| 2009/0044505 A1* | 2/2009 | Huster ................ A01D 43/087 56/10.2 R |
| 2009/0142133 A1 | 6/2009 | Glee et al. |
| 2011/0061762 A1* | 3/2011 | Madsen ................ B65G 67/32 141/1 |
| 2012/0095641 A1* | 4/2012 | Merk ................... G08G 1/0175 701/28 |
| 2012/0263560 A1 | 10/2012 | Diekhans et al. |
| 2013/0080000 A1* | 3/2013 | Lippe .................. E01C 23/088 701/50 |
| 2014/0354816 A1* | 12/2014 | Inanobe ................ B60R 1/002 348/148 |
| 2017/0009408 A1* | 1/2017 | Marsolek ............ G05B 19/042 |

FOREIGN PATENT DOCUMENTS

| | | |
|---|---|---|
| EP | 2020174 A1 | 2/2009 |
| EP | 2510775 A1 | 10/2012 |
| EP | 2573266 A2 | 3/2013 |
| JP | 04122711 A | 4/1992 |

OTHER PUBLICATIONS

China Search Report of 2017800076765 dated Jan. 23, 2017, 2 pages (not prior art).

* cited by examiner

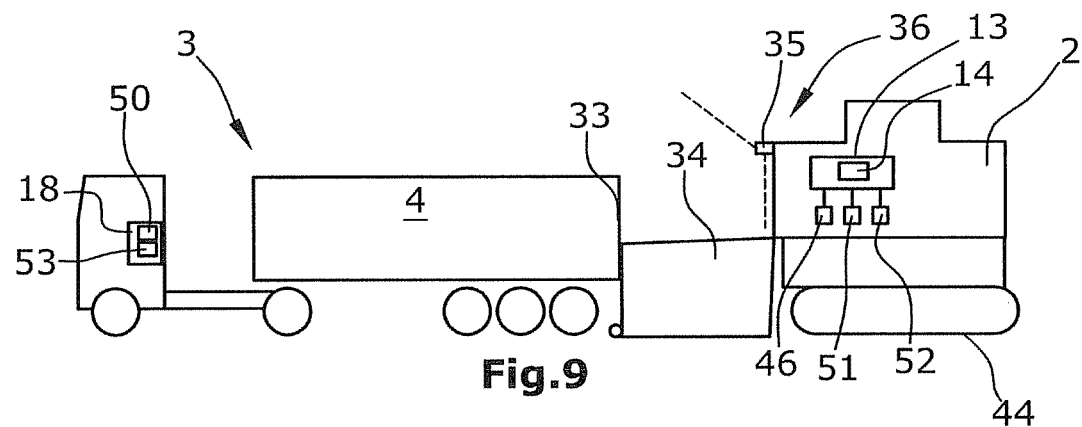
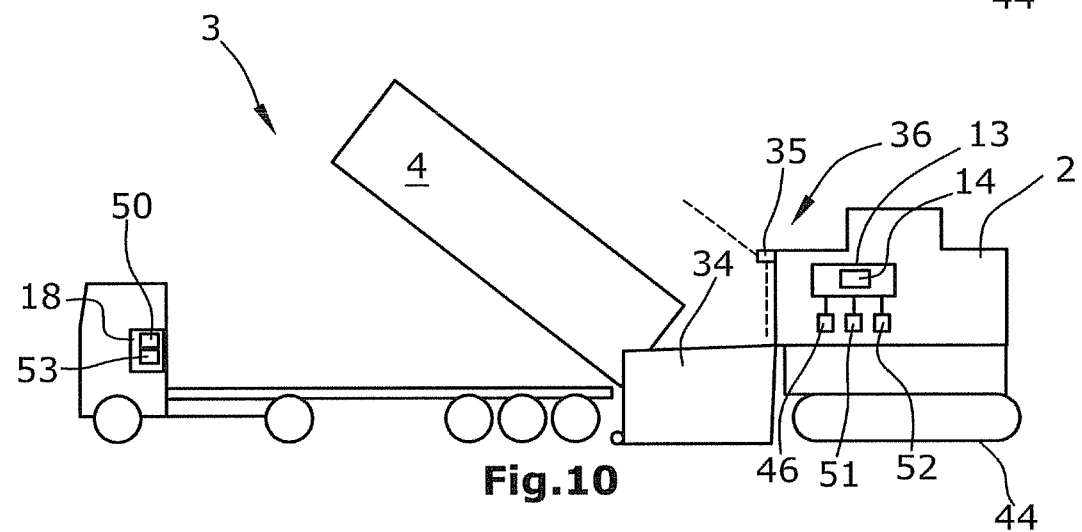
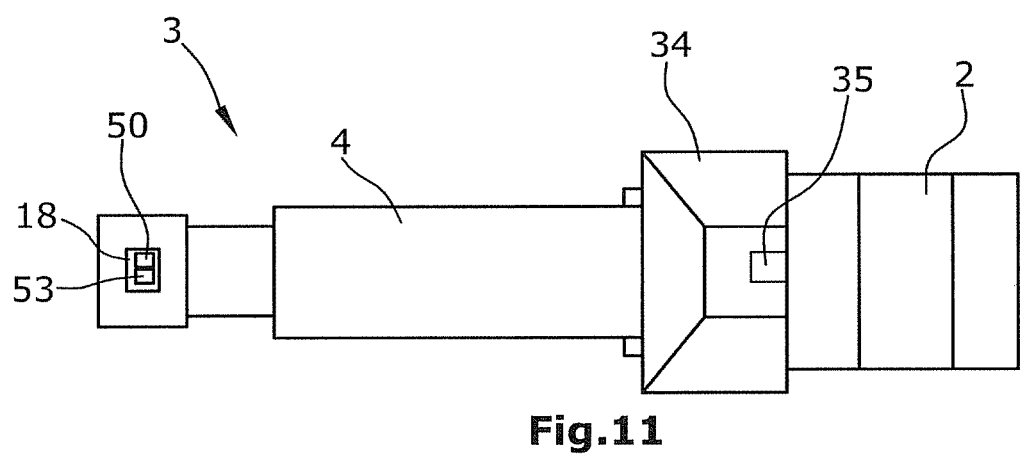

SYSTEM COMPRISING CONSTRUCTION MACHINE, TRANSPORT VEHICLE WITH LOADING SPACE AND IMAGE-RECORDING DEVICE, AND METHOD FOR DISPLAYING AN IMAGE STREAM DURING THE LOADING OR UNLOADING OF A TRANSPORT VEHICLE

The invention relates to a system comprising construction machine, transport vehicle with loading space and image-recording device. Furthermore, the invention relates to a method for displaying an image stream during the loading or unloading of a transport vehicle.

Transport vehicles are filled by means of a multitude of different loading methods. Bulk material is loaded onto transport vehicles, for example, by means of a belt conveyor. This loading procedure is in widespread use especially with construction machines, the primary function of which does not consist in loading transport vehicles.

A uniform distribution of bulk material on the loading space is aimed at but frequently not achieved, since this depends on correct communication between the driver of the transport vehicle and the operator of the construction machine. The operator of the construction machine needs to muster a high level of concentration for the primary operation of the machine and additionally give the driver of the transport vehicle a suitable signal to move his vehicle. Such signals may be transmitted in audible or visual form.

The construction machine may, for example, be a forward-loading milling machine which discharges the milling material towards the front onto the transport vehicle driving ahead. In the process, the speed of the transport vehicle is generally higher than that of the road milling machine. The point of discharge above the loading surface of the transport vehicle therefore travels from the front towards the rear. This can be observed by the machine operator of the road milling machine. When the point of discharge is at the rear end of the loading surface, the machine operator of the road milling machine operates the horn in order to request the vehicle driver of the transport vehicle to stop the transport vehicle. Since the road milling machine keeps driving, the point of discharge travels to the front end of the loading surface. When the point of discharge has reached the front end of the loading surface, the machine operator of the road milling machine operates the horn again in order to request the vehicle driver of the transport vehicle to start driving. In this way, the transport vehicle moves forward intermittently, whereas the construction machine moves forward continuously.

The request to start driving and stop the transport vehicle by means of horn alerts may pose a problem in certain situations. A problem may arise in the situation in which the vehicle driver of the transport vehicle fails to hear the horn alert, or if another vehicle driving past emits a horn alert so that the vehicle driver of the transport vehicle erroneously believes to be required to move his vehicle forward. If the vehicle driver fails to hear the horn alert, this may cause a collision of the construction machine with the transport vehicle, or the operator of the milling machine may need to stop the continuous milling operation.

On the other hand, the construction machine operator cannot accurately estimate the weight of the bulk material possible for a specific transport vehicle, since the transport vehicles have different sizes, and therefore the weight of the bulk material can be estimated only inaccurately. An excessively high load affects traffic safety, however, and an excessively low load is economically disadvantageous. Ultimately, care must also always be taken that no collisions occur during a movement of the transport vehicle and/or construction machine.

Bulk material is also transported to the construction sites by means of transport vehicles, where said bulk material is then used. In order to guarantee efficient material transport, the bulk material is frequently unloaded from the transport vehicle directly into the construction machine. The construction machines then convey said material for direct paving or for filling other construction machines by means of a belt conveyor. This is in widespread use among construction machines, the primary function of which consists in using the material in construction.

In the process, complete unloading of the bulk material from the loading space of the transport vehicle is frequently not achieved, however, since unloading of the bulk material also depends on correct communication between the driver of the transport vehicle and the operator of the construction machine. In addition, the driver of the transport vehicle cannot accurately estimate the progress of the unloading process, since the loading space is tilted during unloading, and the driver of the transport vehicle thus has no insight into the loading space.

Especially for unloading, the driver of the transport vehicle is frequently forced to precisely approach the construction machine and dock there before the dumper vehicle is emptied. In the process, collisions easily occur between the dumper vehicle and the construction machine.

In a construction machine which is a road paver, the road paver is loaded with material while the road paver is moving slowly forward. The transport vehicle approaches the road paver slowly in reverse travel until contact has been made between the road paver and the transport vehicle. The transport vehicle is thereafter pushed by the road paver ahead of the road paver, and emptying takes place.

The process is particularly complicated if the transport vehicle is in motion during the docking phase and a severe collision between the construction machine and the transport vehicle has to be avoided. This leads to oftentimes hectic communication between the driver of the transport vehicle and the operator of the construction machine during the docking process prior to emptying or filling the transport vehicle.

It is therefore the object of the invention to provide a system and a method by means of which the coordination between the transport vehicle and the construction machine is improved.

Said object is achieved by a system offering the features of patent claim 1, and by a method offering the features of patent claim 21. Advantageous further developments are the subject matter of the dependent claims.

The invention advantageously specifies for an image-recording device to be arranged at the construction machine and to be aligned, as a minimum, towards the loading space of the transport vehicle, where a reception and display device is arranged at or in the transport vehicle, where the data recorded by the image-recording device are transmitted to the reception and display device by means of a transmission device arranged at the construction machine.

The transport vehicle may be a dumper vehicle or a truck with a loading surface or loading space, respectively.

Arranging the image-recording device at the construction machine has the advantage that, with many alternating transport vehicles for the delivery and collection of material, a single image-recording device only is required at the construction machine, and not one image-recording device each is required for each transport vehicle. When positioning the transport vehicle relative to the construction machine, it is inevitably ensured that the image-recording device is optimally aligned towards the loading space of the transport vehicle. Although the vehicle driver of the transport vehicle, in particular, requires optimal images for moving the transport vehicle, according to the invention, the image-recording device is not arranged at the transport vehicle but at the construction machine.

The data may be transmitted to the vehicle driver of the transport vehicle wirelessly such as, for example, via the Internet, WLAN, Bluetooth or similar devices. In this context, transmission media for shorter distances are also sufficient, since the vehicle driver of the transport vehicle requires information from the image-recording device at the construction machine only when he has moved his transport vehicle close to the construction machine.

The same reception and display device in the environment of the driver of the transport vehicle may therefore communicate with different image-recording devices arranged at different construction machines. A defined format allows for images of that particular construction machine to be made available to the driver of the transport vehicle, in the environment of which the driver of the transport vehicle is located. The driver of the transport vehicle therefore requires only a reception and display device, whilst the construction machine requires an image-recording device and a transmission device.

The data recorded may be image data. The data may be transmitted encrypted or unencrypted. In addition, the scope of the data to be transmitted may be adapted to the quality of the connection.

An advantageous embodiment variant specifies for the construction machine to comprise a conveying device and for the image-recording device to also be aligned towards the conveying device. This makes it possible to simultaneously monitor the loading space of the transport vehicle and the conveying device. Whilst it is a matter of uniform loading in the case of the loading surface, the focus of monitoring the conveying device is on avoiding a collision between the conveying device and the transport vehicle.

According to a special embodiment of the invention, the user can view, on a split image of the monitoring screen, the loading space in the direction of travel of the transport vehicle in a first image and the conveying device of the construction machine in a separate second image. In said separate second image, the user can view the possible points of collision in order to avoid a collision between the transport vehicle and the conveying device or loading device, respectively.

To ensure a good overview with the image-recording device, it is proposed that the image-recording device is arranged at the conveying device. This allows a relatively high position on the one hand, and a position close to the transport vehicle during loading and unloading on the other. In addition, the advantage results that the image-recording device can be pivoted together with the belt conveyor. When the belt conveyor needs to be pivoted in the direction of the loading surface (for example, because the transport vehicle and the construction machine must drive at an offset to one another due to conditions on the construction site), the image-recording device nevertheless remains aligned towards the transport vehicle and especially towards the loading space to be loaded.

The image-recording device may be mounted to pivot about a cross beam to the direction of operation of a belt conveyor of the conveying device above the centre of gravity of the conveying device. In this arrangement, it may be ensured by means of a drive or a weight that the alignment of the image-recording device relative to the plane of the ground remains unchanged even in the case of an adjustment of the angle of the belt conveyor.

Such a suspended pivotable mounting also results in a protection of the image-recording device which can thus yield in the case of a collision in that it is pivoted about the point of support. Alternatively, a protection can also be achieved in that the image-recording device is resiliently mounted at the construction machine and especially at a conveying device of the construction machine in order to be pivotable in the case of a collision and return to its original position thereafter.

The system described thus makes it easier for the driver of the transport vehicle and/or the construction machine to maintain an overview of the loading procedure in order to be able to effectively control the loading process by placing the transport vehicle precisely at the point where the load is loaded onto a specific point of the loading space of the transport vehicle. Mounting the image-recording device at the construction machine has the advantage that the point of discharge remains constant in its relation to the monitoring image, and positioning of the transport vehicle is facilitated as a result. A high position in the arrangement of the image-recording device at the construction machine has the advantage that the monitoring image can show a complete overview.

With a view in particular to unloading a dumper vehicle, a system is proposed in which the construction machine comprises a receptacle and the image-recording device is also aligned towards the receptacle. This makes it possible to display a split monitoring image on the screen of the user, that is, the loading space in the direction of travel of the transport vehicle in one image, and the reception device of the construction machine, that is, the receptacle in a separate image. The image of the receptacle may show the user possible points of collision between the receptacle and transport vehicle. Recording the loading space and the receptacle makes it possible for the user to maintain an overview of the unloading procedure in order to control it safely and effectively. In particular, the vehicle driver of the transport vehicle can position the transport vehicle at the point where the load can be safely unloaded into the receptacle after the docking procedure.

Depending on the embodiment of the construction machine, it is advantageous for the image-recording device to be arranged at an as high level as possible. It is therefore proposed that the image-recording device is arranged in the uppermost third of the construction machine.

The image-recording device may comprise one or multiple cameras for recording single images. According to the invention, the cameras may be different in design and, for example, detect different wavelength ranges and/or feature different recording technologies. Customary optical cameras which detect the visible range of the light, for example, or infrared cameras may be used. Alternatively, detection devices such as PMD cameras may be used, for example, which can additionally provide distance information via travel-time measurement. If multiple cameras are used, different recording procedures may be used or different wavelength ranges detected simultaneously. It is thus possible, for example, to use an infrared camera and a camera for wavelength ranges corresponding to visible light, or an optical camera with a CCD sensor and a camera with PMD sensor.

It is particularly advantageous if the image-recording device comprises at least one camera for recording an image stream. Such an image stream continuously shows any change in the positions of the transport vehicle and construction machine, and the change on the loading space during loading and unloading of the dumper vehicle.

A video camera with a wide-angle lens and/or an infrared camera and/or a stereoscopic camera and/or a PMD camera is particularly suitable for this purpose.

A wide-angle lens permits alignment towards the loading space and the conveying device or a receptacle. Alternatively, two cameras may also be specified for this purpose, which are aligned accordingly. It is therefore proposed that the image-recording device comprises two cameras or one camera with two viewing angles for the creation of two subset image streams.

Distance information may additionally be detected by means of a stereoscopic camera and/or a PMD camera.

Especially in the case of a wide-angle lens, the two subset image streams may also be calculated from an original image stream.

Additional illumination may be provided in the observation range of the camera in order to improve the recording quality. At least one illuminant and/or at least one mirror may be specified, where the illuminant is preferably arranged at or next to the camera, and the mirror is preferably placed in the field of view of the camera in such a fashion that the observable area can be enlarged.

The camera may be arranged at an unmanned aerial vehicle.

The image-recording device may additionally detect a registration plate, for example, the vehicle registration plate of the transport vehicle. The registration plate may also be transmitted to the reception and display device by means of the transmission device.

In addition to the data recorded by the image-recording device, the transmission device may transmit further data to the reception and display device.

Said further data may be other machine information, in particular, data relating to the milling material and/or data determined from the image information by means of an evaluation unit and/or messages from the driver of the construction machine to the driver of the transport vehicle, preferably start or stop signals specified by the driver of the construction machine for the driver of the transport vehicle.

Milling material is the material which is removed with a milling machine. The data relating to the milling material may be data relating to the material properties of the milling material, in particular the material of the milling material, and/or location data of the milled section of the ground pavement.

Regarding the data relating to material properties of the milling material, these may directly describe the material properties of the material, or may be data which enable conclusions to be drawn about the material. For the purposes of the invention, the location data of the milled section of the ground pavement may therefore also be data relating to the material properties of the milling material. It may be determined, for example, which motorway section is being milled. It may be known which material has been used in the construction of the motorway section so that it can be determined based on the motorway section which material has been used in its construction.

It may be known, for example, which asphalt has been used in the construction, or the composition of the material used in the construction may be known. It may also be known which material has been used in the construction of different layers of the ground pavement. As a rule, the ground pavement comprises a surface layer, a binder layer and a base layer. The known information regarding the material may be stored in a data base (for example, locally on the milling machine or outside of the milling machine), or said information may be entered by an operator of the milling machine. The location data may also be determined based on GPS coordinates.

Samples of the milled-off material may also be taken, for example, and evaluated immediately or at a later date. For the purposes of the invention, the data relating to the material properties of the milling material may also be data signals which relate to the number or the name of such sample.

The data relating to the milling material may be operating parameters of the milling machine, or data or data signals, respectively, which are determined by means of the operating parameters, location data or information entered. As a result, both the directly determined or entered data or data signals, respectively, as well as data derived therefrom, may be detected as data relating to the milling material.

Operating parameters may specifically be the milling depth, the milling volume removed, the advance speed, the milling drum speed of revolution, the relation between advance speed and milling drum speed of revolution, the milling drum used, the torque/output emitted by the drive engine of the milling machine, or the amount of water fed during the milling process to cool the milling tools. Furthermore, it may be detected as to whether the milling machine is operating in down-milling or in up-milling mode (milling drum rotating in the same direction/in the opposite direction as the ground-engaging units). The data relating to the milling material may also be the mass and/or volume of the milling material loaded onto the transport vehicle.

If, for example, the mass of the milling material loaded onto the transport vehicle is detected and transmitted to the machine operator and/or the driver of the transport vehicle, efficient loading of the transport vehicle can be effected without over- or underloading.

Data can be determined by means of said operating parameters. These can be material properties of the milling material such as, for example, the grain size distribution in the milling material, fine fractions/coarse fractions. The physical properties can be derived from, for example, the relation between the advance rate and the milling drum speed of revolution, or the milling drum used.

Furthermore, it can be determined from the operating parameters, for example, from the milling depth, which layer of the ground pavement has been milled. The ground pavement comprises, for example, a surface layer, a binder layer and a base layer which, as a rule, feature different layer thicknesses. In addition to the milling depth, location data detected by the milling machine may also be taken into account, for example, to determine if milling has already been performed in a specific position. This information can be correlated to allow for more accurate conclusions to be drawn about the layer just milled.

The reception and display device may comprise a second transmission device, and a second reception device may be arranged at the construction machine so that messages can be sent from the driver of the transport vehicle to the driver of the construction machine via the second transmission device. It is therefore possible for messages to be exchanged between the driver of the transport vehicle and the operator of the construction machine.

The second transmission device and the reception and display device may be designed as a unit.

The second reception device and the transmission device of the construction machine may also be designed as a unit.

The system may comprise an evaluation unit. The evaluation unit may comprise an image-analysing programme which determines additional data from the image information.

The evaluation unit may determine the filling level in the loading space and/or the distance between the construction machine and the transport vehicle and/or the point of impingement of material in the loading space by evaluating the data of the image-recording device.

An imminent collision of the construction machine and the transport vehicle can be determined by means of the distance between the construction machine and the transport vehicle.

The point of impingement of the material may be the actual point of impingement of the material in the loading space and also, in the case of the conveying device being switched off, the potential point of impingement in the loading space when the belt conveyor is driven again. To determine the potential point of impingement, further parameters such as, for example, the inclination of the belt conveyor may be included.

It may be determined based on the actual point of impingement of the material in the loading space if the material is still discharged within the loading space and if the point of impingement is in the peripheral area of the loading space and the transport vehicle therefore needs to move again promptly in relation to the construction machine.

The further data which are transmitted by the transmission device to the reception and display device in addition to the data recorded by the image-recording device may be data determined by the evaluation unit, in particular, start or stop signals for the driver of the transport vehicle and/or the mass of the milling material loaded and/or a collision warning.

The evaluation unit may determine, as a function of the point of impingement of the material in the loading space and/or as a function of the distance between the construction machine and transport vehicle, a start or stop signal which is transmitted to the reception and display device via the transmission device.

In addition, the evaluation unit may also alter the contrast or the brightness of the image stream recorded with the image-recording device or highlight, in the image stream, for example, edges visible in the image (for example, the loading edges of the loading surface and/or the outer boundary of the conveying device). As a result of this, the visual evaluation of the image stream transmitted is made easier for the driver of the transport vehicle.

The image-analysing programme may, for example, show subset image streams on different screens or on different screen sections, and it may assign, in the image streams, structures to the construction machine, the transport vehicle or the loading space in order to call attention to collisions at an early stage.

In order to provide the system with different types of information, it is proposed that the image-recording device comprises at least one camera which is mounted to pivot in a controllable fashion. The control feature makes it possible to cover a large viewing angle. However, the at least one camera may, for example, also be positioned or aligned as a function of the position and inclination of the conveying device in order to, for example, in the case of a change in the inclination of the conveying device in the case of a camera mounted at the conveying device, keep the same constantly aligned towards one point such as, for example, the loading space of the transport vehicle.

To protect the camera, the same may be arranged behind metal brackets. In this arrangement, the metal brackets are arranged in such a fashion that the viewing angle of the camera is impaired as little as possible but damage to the camera behind the metal brackets is prevented. Alternatively or cumulatively, the camera may be resiliently mounted in order to be able to deflect in the event of a collision of the camera with an object and to return to the original position thereafter.

A preferred embodiment variant specifies for the reception and display device to be a portable computer, preferably a mobile telephone.

Said portable computer may record, process and display data from the image-recording device using a wired or in particular wireless connection. It may also be arranged in proximity inside the driver's cabin of the transport vehicle in order to improve the cooperation between the transport vehicle and the construction machine.

The transport vehicle may furthermore be identifiable, for example, by means of a unique user identity (such as the vehicle registration plate of the transport vehicle). A scope of information adjusted to the current task may be provided to the reception and display device pertaining to the transport vehicle. An adjustment may thus be made as to whether and in what quality an image stream is made available, and/or as to whether and to what extent further data are transmitted.

A Personal Digital Assistant (PDA) is particularly suitable as a portable computer, the same being already known in different embodiment variants in particular as a mobile telephone and preferably including, in addition to other programmes, calendar and address programmes. The computers may comprise processors and/or computer-readable memories and/or data bases. The same may also comprise a user interface. Such portable computers may be equipped with a special programme which is specially programmed as an application for use with the system comprising construction machine, transport vehicle and image-recording device. This feature enables the use of a known display device as a screen and input unit for optimizing the control of the construction machine, transport vehicle and image-recording device.

A first storage device may be arranged at the construction machine, and/or the reception and display device may comprise a second storage device, where the data recorded by the image-recording device, and/or the further data which are transmitted to the reception and display device in addition to the data recorded by the image-recording device, are storable in the first and/or the second storage device.

The evaluation unit, the transmission device, the reception device and the storage device may individually or also jointly likewise represent a computer system. Such computer system may comprise one or multiple processors and/or one or multiple computer-readable memories and/or one or multiple data bases. It may also comprise one or multiple user interfaces.

Furthermore, a method according to the invention for displaying an image stream during the loading or unloading of a transport vehicle comprises the following steps:
  recording images with an image-recording device mounted at a construction machine and aligned, as a minimum, towards the loading space of the transport vehicle,
  transmitting, receiving and displaying the data recorded with the image-recording device on a reception and display device arranged at or inside the transport vehicle.

The data recorded with the image-recording device may be an image stream. The image-recording device may be a camera.

This method enables a person to perceive the loading and unloading of a transport vehicle on a reception and display device in such a fashion that he can easily optimize the position of the transport vehicle and the loading and unloading of the transport vehicle.

It is advantageous in this context if, in the method, at least two subset image streams are displayed on the screen simultaneously, where each subset image stream contains a separate subset of images from the original image stream. This makes it possible to simultaneously monitor not only a single location but different locations such as, for example, the loading surface and the loading device, or the loading surface and a receptacle, in order to optimize the loading or unloading process by means of controlling the transport vehicle and the construction machine.

It is particularly advantageous in this regard if the camera is aligned pointing away from the construction machine. Said alignment makes it possible, in particular when using a wide-angle lens, to observe a large work area around the construction machine. In the process, a part of the image stream may also detect parts or boundaries of the construction machine in order to, in particular, avoid collisions.

A special embodiment variant specifies for the position and/or the alignment of the camera to be determined and, in the case of a change in the position or alignment, for the image stream to be displayed according to the original alignment. This means that, even when the alignment of the camera is varied as a result of a pivoting operation or trembling movement of the camera, the image-processing feature ensures that the screen shows an image which corresponds to a non-pivoted or non-trembling camera.

At least one illuminant and/or at least one mirror may be specified, where the illuminant is preferably arranged at or next to the camera, and the mirror is preferably placed in the field of view of the camera in such a fashion that the observable area is enlarged.

The camera may be arranged at an unmanned aerial vehicle. The unmanned aerial vehicle may, for example, be a drone.

The registration plate of the transport vehicle may be additionally detected.

In addition to the data recorded, further data may be transmitted to the reception and display device.

Said further data may be data relating to the milling material and/or data determined from the data of the image-recording device by means of an evaluation unit and/or messages from the driver of the construction machine to the driver of the transport vehicle, preferably start or stop signals specified by the driver of the construction machine for the driver of the transport vehicle. Data relating to the milling material have been explained in more detail above.

Messages may be sent from the driver of the transport vehicle to the driver of the construction machine.

The use of an evaluation unit makes it possible to evaluate the data recorded with the image-recording device.

The further data which are transmitted to the reception and display device in addition to the data recorded by the image-recording device may be data determined by the evaluation unit, in particular, start or stop signals for the driver of the transport vehicle and/or the mass of the milling material loaded and/or a collision warning.

The filling level in the loading space and/or the distance between the construction machine and the transport vehicle and/or the point of impingement of material in the loading space may be determined by evaluating the image data by means of the evaluation unit.

A start or stop signal may be determined by means of the evaluation unit as a function of the point of impingement of the material in the loading space and/or as a function of the distance between the construction machine and the transport vehicle, which is transmitted to the reception and display device.

The evaluation unit may, for example, monitor the loading of the loading surface of the transport vehicle and, in the case of a material cone which exceeds a specified default, generate a signal which indicates to the vehicle driver that he must change the position of the loading surface. When the evaluation unit recognizes perimeters of a transport vehicle and perimeters of the construction machine and distinguishes them from the transport vehicle, it may indicate an imminent collision by means of a signal in the case of too close an approach of the transport vehicle and construction machine.

The reception and display device may be a portable computer. Any other radio-enabled, mobile communication device is also suitable as a reception and display device.

The reception and display device may be arranged inside the cockpit of the transport vehicle.

In order to be able to make the monitoring images available to multiple parties at low cost, it is proposed that the image stream is displayed on no less than two screens. It is advantageous for this purpose if the monitoring images are made available by a mobile application. To this effect, a password-secured radio connection may be set up between the computer comprising the screen and the image-recording device which a user can access, for example, via such application in order to receive the monitoring image. In this arrangement, the information may be displayed on multiple registered devices. The individual users of the application may furthermore be identified, for example, by means of a unique user identity (such as the vehicle registration plate of the transport vehicle). A scope of information adjusted to the current task may then be provided to each user. An adjustment may therefore be made as to whether and in what quality an image stream is made available, and/or as to whether and to what extent further data are transmitted.

The data recorded by the image-recording device, and/or the further data which are transmitted to the reception and display device in addition to the data recorded by the image-recording device, may be stored.

The storage may be effected in a first storage device which is arranged at the construction machine, and/or effected in a second storage device which is arranged at the reception and display device.

It is proposed that the image stream and/or the message stream are stored, in particular, as evidence in the case of collisions between the transport vehicle and the construction machine. This makes it possible to retrace, also after a collision, whether the collision was caused by the driver of the transport vehicle or by the operator of the construction machine.

To prevent collisions and, for example, the overloading of transport vehicles at an early stage, however, it is proposed that a reference image is displayed on the screen of the compact computer and a signal generated in the case of a specified deviation of the image stream from the reference image. A signal which indicates a deviation from a specified default may be a sound, a colour scheme or, for example, also a vibration of the display device. The reference image may be a representation of an optimized position of the transport vehicle and the construction machine relative to one another, for example, or a maximum loading of the loading surfaces of the transport vehicle. To this end, the monitoring image may be provided with an animated image boundary which can be adjusted by the user of the mobile application so that said user has an independent reference point in order to, for example, safely manoeuvre towards the construction machine during each docking procedure.

Figure 2:
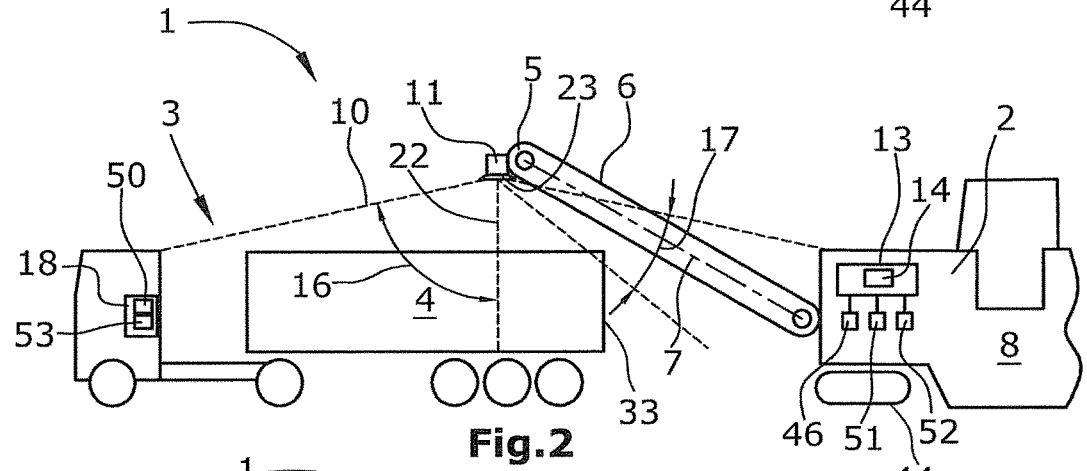
Figure 3:
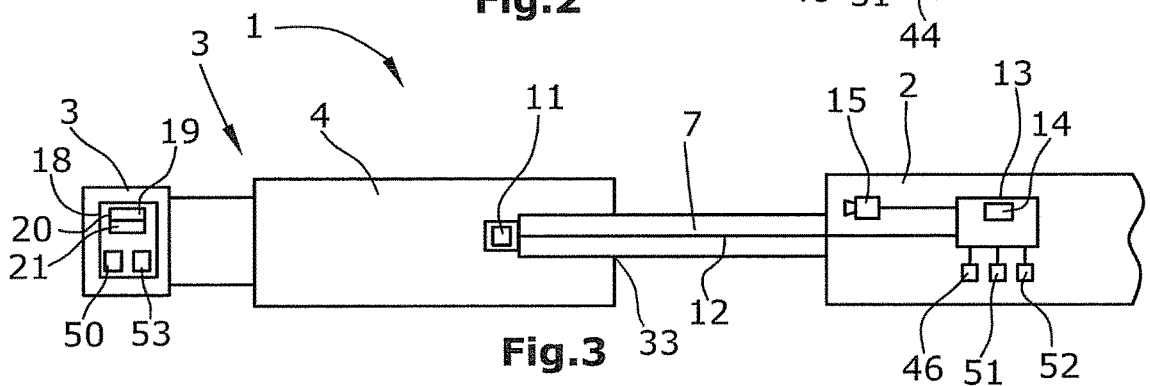
Figure 4:
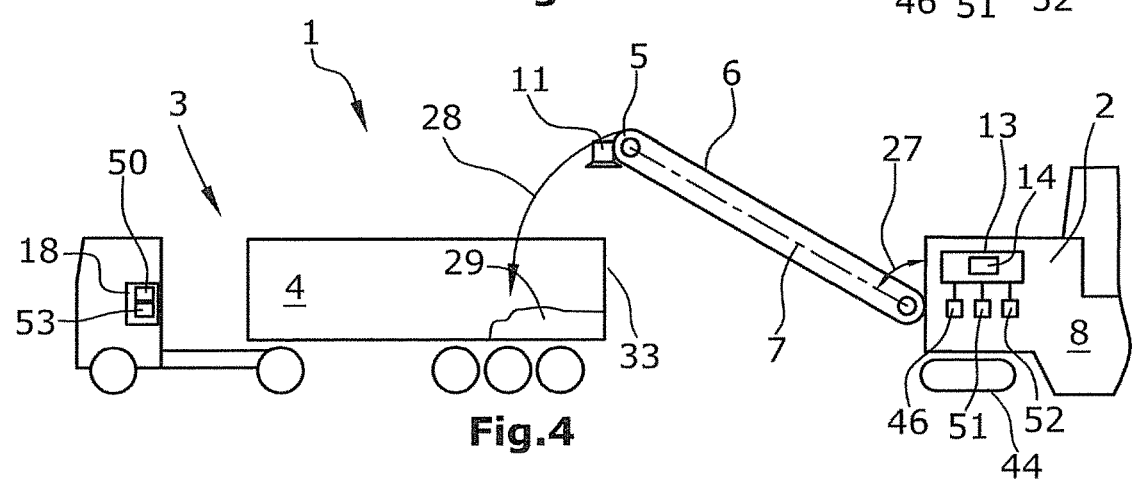
Figure 5:
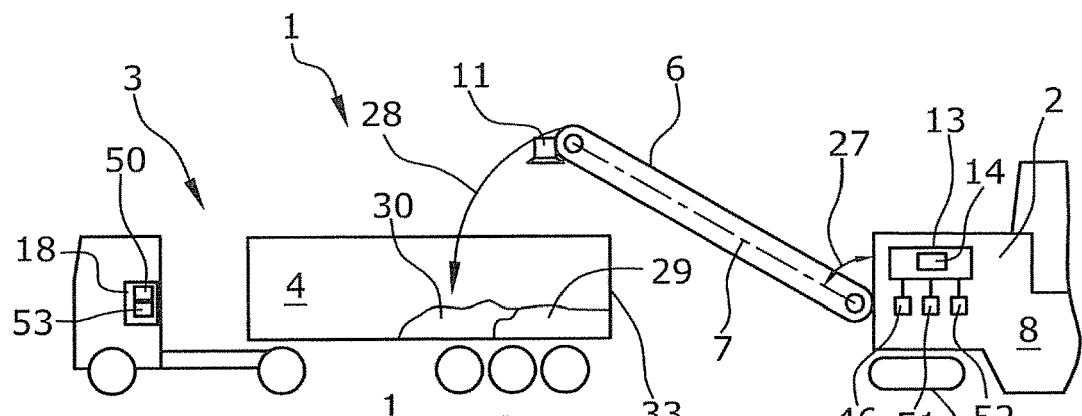
Figure 6:
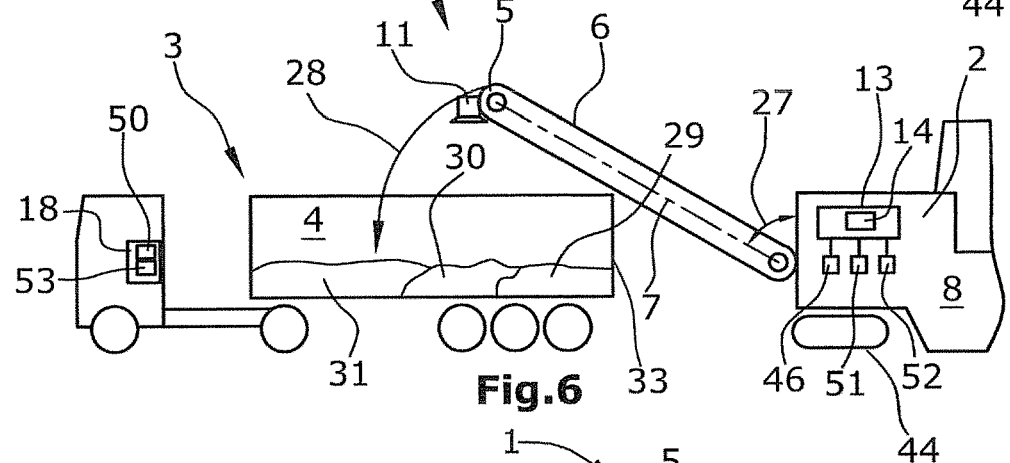
Figure 7:
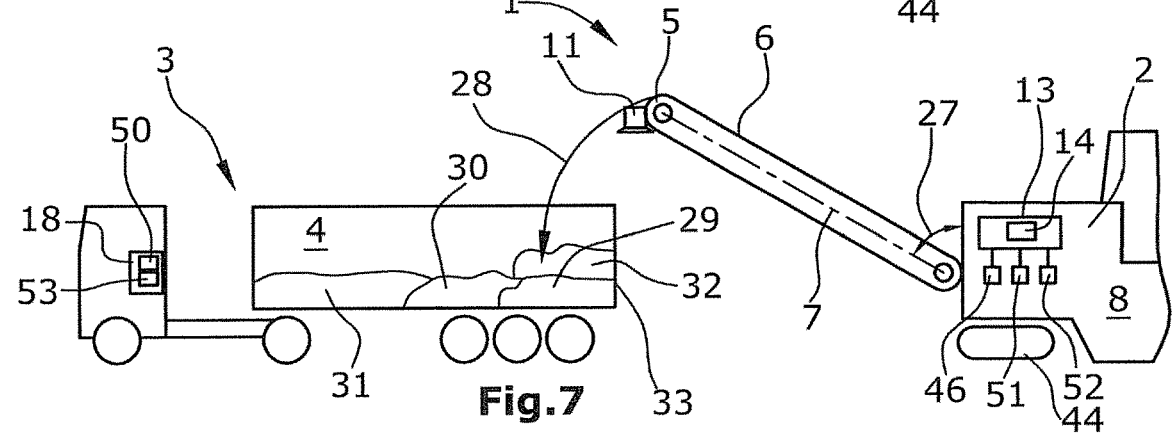
Figure 8:
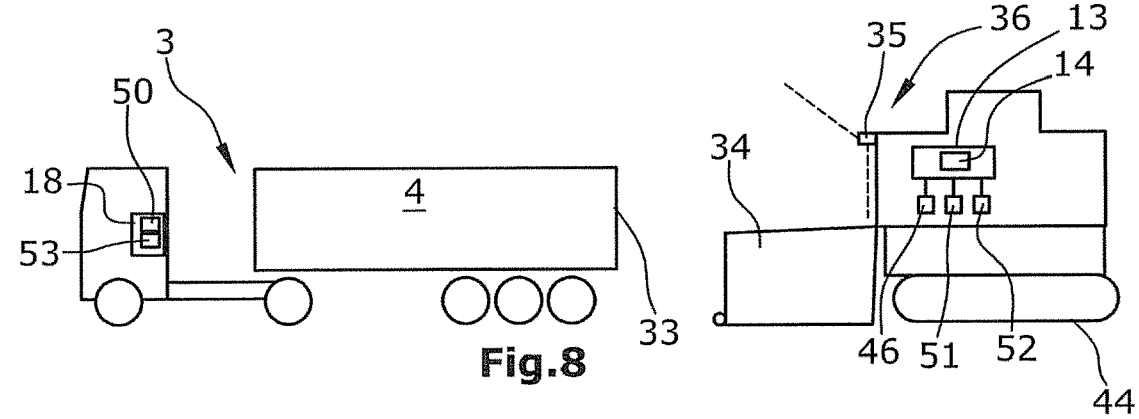

Taking one embodiment as an example, first the loading of a transport vehicle and then the unloading of a transport vehicle are hereinafter explained in more detail with reference to the drawings. The following is shown:

FIG. 1 schematically a side view of the transport vehicle and construction machine with image-recording device and wide-angle lens, FIG. 2 schematically a side view according to FIG. 1 with an image-recording device with two cameras, FIG. 3 a top view of the arrangement shown in FIG. 2, FIG. 4 a side view to illustrate the first step of loading the transport vehicle, FIG. 5 a schematic side view according to FIG. 4 with the transport vehicle driven back slightly, FIG. 6 a schematic side view according to FIG. 5 with the transport vehicle driven back further, FIG. 7 schematically a side view of the transport vehicle driven forward again, FIG. 8 schematically a side view of a transport vehicle distanced to a construction machine, FIG. 9 schematically a side view of a transport vehicle driven up to a construction machine, FIG. 10 schematically a side view of a transport vehicle with tilted loading surface, FIG. 11 schematically a top view of the arrangement of transport vehicle and construction machine shown in FIG. 9.

FIG. 1 shows the system 1 comprising construction machine 2, transport vehicle 3 with loading space 4 and image-recording device 5. The image-recording device 5 is arranged at the construction machine 2 and aligned, as a minimum, towards the loading space 4 of the transport vehicle 3. The construction machine 2 comprises, as conveying device 6, a belt conveyor 7 arranged to pivot at the machine frame 8 of the construction machine 2. The image-recording device 5 may comprise one or multiple cameras 11 for recording data. The image-recording device 5 is arranged at the uppermost end of the belt conveyor 7 so that the camera lens 9 of the camera 11 is directed downwards in such a fashion that the viewing angle 10 detects the entire loading space 4 of the transport vehicle 3 and a part of the construction machine 2.

In the embodiment shown, the construction machine 2 is preferably a milling machine for milling a section of a ground pavement. The ground pavement is milled by means of the milling machine, and the removed material or milling material, respectively, is loaded onto the transport vehicle 3 via the at least one belt conveyor 7. The milling machine may comprise, as a minimum, a machine frame. Furthermore, the milling machine may comprise a height-adjustable milling drum for working the ground pavement. The milling drum is driven by a drive unit. The drive unit is preferably a drive motor, specifically, a combustion engine. The milling machine comprises travelling devices 44. Said travelling devices 44 may be wheels or tracked ground-engaging units. The travelling devices 44 may be connected to the machine frame 8 via lifting columns. The milling machine or the machine frame 8, respectively, can be adjusted in height relative to the ground pavement by means of the lifting columns. The machine frame 8 is adjusted in height by adjusting the lifting columns, and as a result, the not-depicted milling drum mounted in the machine frame 8 is adjusted in height as well. Alternatively or additionally, the milling drum may be adjustable in height relative to the machine frame 8.

A reception and display device 18 is arranged at or in the transport vehicle 3, where the data recorded by the image-recording device 5 are transmitted to the reception and display device 18 by means of a transmission device 46 arranged at the construction machine. Alternatively, the reception and display device 18 may be designed as a mobile unit and carried along, for example, by the driver of the transport vehicle.

The image-recording device 5 may additionally detect a registration plate, for example, the vehicle registration plate of the transport vehicle. The information concerning the registration plate may also be transmitted to the reception and display device by means of the transmission device 46.

The transmission device 46 may transmit further data to the reception and display device 18 in addition to the data recorded by the image-recording device.

Said further data may be other machine information, in particular, data relating to the milling material and/or messages from the driver of the construction machine 2 to the driver of the transport vehicle 3, preferably start or stop signals specified by the driver of the construction machine 2 for the driver of the transport vehicle 3.

The reception and display device 18 may comprise a second transmission device 50, and a second reception device 51 may be arranged at the construction machine 2 so that messages can be sent from the driver of the transport vehicle 3 to the driver of the construction machine 2 via the second transmission device 50. It is therefore possible to exchange messages between the driver of the transport vehicle and the operator of the construction machine.

The second transmission device 50 and the reception and display device may be designed as a unit. The second reception device and the transmission device 46 may also be designed as a unit.

The system 1 may comprise an evaluation unit 13 for evaluating the data recorded with the image-recording device 5 by means of, for example, a unit for image analysis 14.

The evaluation unit 13 may determine the filling level in the loading space and/or the distance between the construction machine 2 and the transport vehicle 3 and/or the point of impingement of material in the loading space 4 by evaluating the image data.

An imminent collision of the construction machine 2 and the transport vehicle 3 can be determined by means of the distance between the construction machine 2 and the transport vehicle 3.

The point of impingement of the material may be the actual point of impingement of the material in the loading space 4 and also, in the case of the conveying device being switched off, the potential point of impingement in the loading space 4 when the belt conveyor 6 is driven again. To determine the potential point of impingement, further parameters such as, for example, the inclination of the belt conveyor 6 may also be included.

It may be determined based on the actual point of impingement of the material in the loading space 4 whether the material is still discharged within the loading space 4 and whether the point of impingement is in the peripheral area of the loading space 4 and the transport vehicle 3 therefore needs to move again soon in relation to the construction machine 2.

The further data which are transmitted by the transmission device 46 to the reception and display device 18 in addition to the data recorded by the image-recording device 5 may be data determined by the evaluation unit 13, in particular, start or stop signals for the driver of the transport vehicle 3 and/or the mass of the milling material loaded and/or a collision warning.

The evaluation unit 13 may determine, as a function of the point of impingement of the material in the loading space and/or as a function of the distance between the construction machine 2 and the transport vehicle 3, a start or stop signal which is transmitted to the reception and display device 18 via the transmission device 45.

The camera lens 9 is preferably a wide-angle lens of a camera 11 which, as a video camera, records an original image stream 12. The data recorded may be forwarded to the evaluation unit 13. Alternatively or additionally, an infrared camera and/or a stereoscopic camera and/or a PMD camera may also be used.

The camera 11 may, as a video camera, forward an original image stream 12 to the evaluation unit 13 which covers information from the entire viewing angle 10. It may, however, also forward subset image streams on subset viewing angles 16, 17 to the evaluation unit 13. Subset image streams from an original image stream 12 may, however, also be generated in the evaluation unit 13, or subset image streams from the original image stream 12 may also only be generated in the reception and display device 18 and be displayed on a screen 19 of the reception and display device 18 as images 20 and 21. Subset image streams may therefore be already generated at the image-recording device 5 by means of two cameras 22, 23, with the evaluation unit 13 or the reception and display device 18. In the embodiment shown in FIG. 3, two subset image streams are generated in the evaluation unit 13 and transmitted by means of the transmission device 46 in such a fashion that the information on the images can be received by the reception and display device 18.

The camera 11 is fastened at the belt conveyor 7 of the conveying device 6 in such a fashion that the alignment always points directly downwards independent of the angle of inclination 27 of the belt conveyor relative to the machine frame 8 of the construction machine 2. It is thus ensured that the camera always records the loading surface and that section of the belt conveyor where the loading space 4 of the transport vehicle 3 could collide with the conveying device 6.

A first storage device 52 may be arranged at the construction machine 2, and/or the reception and display device 18 may comprise a second storage device 53. The data recorded by the image-recording device 5, and/or the further data which are transmitted to the reception and display device 18 in addition to the data recorded by the image-recording device 5, may be stored in the first and/or the second storage device 52, 53.

A preferred embodiment variant specifies for the reception and display device 18 to be a portable computer, preferably a mobile telephone. A mobile telephone has the advantage that the same is carried along by every driver of a transport vehicle, and that it is therefore not necessary to specify an own reception and display device 18 for each transport vehicle. An application programme may be installed on such mobile telephone by means of which the data of the transmission device can be received and displayed on the screen of the mobile telephone.

When using the system for loading a transport vehicle 3 with the construction machine 2, first, as shown in FIG. 4, material 28 is conveyed onto the loading surface 4 of the dumper vehicle 3 by means of the conveying device 6. In the process, a first heap 29 is created in the rear section of the loading surface 4. The transport vehicle 3 is stationary, whereas the construction machine 2 keeps moving continuously. Since the construction machine 2 keeps driving, the point of discharge travels to the front end of the loading surface, which is depicted in FIGS. 5 and 6 by the heaps 30, 31. When the point of discharge has reached the front end of the loading surface, the vehicle driver of the transport vehicle must move the same forward relative to the construction machine. When the point of impingement has reached the rear end of the loading surface, the vehicle driver of the transport vehicle must stop the transport vehicle again. Heap 32 is again created in the rear section of the loading surface. By means of the present invention, the driver of the transport vehicle receives the information as to whether he has to move or stop the vehicle via the reception and display device 18. An image of the loading space 4 is depicted on the same so that the driver of the transport vehicle recognizes on the basis of this image alone as to when the transport vehicle 3 must be moved. In addition, the driver of the transport vehicle receives information from the operator of the construction machine or from the evaluation unit 13 as to whether the transport vehicle is to be moved or not, for example, in the form of start-stop signals. He can also, for example, receive the information about what type of material has been loaded, whether the maximum weight has been reached and whether a collision with the construction machine is imminent. The coordination between the transport vehicle and the construction machine can thus be improved considerably. In addition, signalling may be effected acoustically, for example, by means of a horn 15.

FIG. 2 shows how both the loading space 4 and the particularly critical section at the conveying device 6 may be observed with the camera 11 in order to control the proper filling of the loading surface on the one hand, and prevent a collision between the tailboard 33 and the conveying device 6 on the other. In this context, the loading procedure is particularly difficult if not only the transport vehicle 3 but also the construction machine 2 is movable.

In the present case, the construction machine 2 can pivot the conveying device 6, and the construction machine can be moved forward and backward in alignment of the transport vehicle 3. The proper loading of the transport vehicle 3 therefore depends not only on the absolute position of the transport vehicle 3 but on the relative position of the transport vehicle 3 to the conveying device 6 and to the machine frame 8 of the construction machine 2.

Since the camera 11 moves with the construction machine 2, the vehicle driver always obtains, via the camera, an image of the situation which shows the transport vehicle 3 and in particular the loading surface 4 of the same in relation to the construction machine 2 and from the direction of the construction machine 2 in order to move the transport vehicle 3 into the correct position relative to the construction machine 2.

FIGS. 8 to 11 show the unloading of a transport vehicle 3 where the loading surface 4 is initially driven up to the construction machine 2 so that the loading surface 4, as shown in FIG. 9, is positioned in front of a receptacle. 34. The loading surface 4 is subsequently tilted so that bulk material flows into the receptacle 34. In this arrangement, a camera 35 is positioned in the uppermost third of the construction machine 2 in such a fashion that it may comprise, as image-recording device 36, a camera with a wide-angle lens or multiple cameras which forward one or multiple image streams to an evaluation unit 13 as shown in FIG. 3.

A construction machine 2 according to FIGS. 8 to 11 is preferably a road paver. When the road paver is loaded with material, the road paver moves slowly forward. The transport vehicle 3 approaches the road paver slowly in reverse travel until contact has been made between the road paver and the transport vehicle 3. The transport vehicle 3 is thereafter pushed by the road paver ahead of the road paver, and emptying takes place.

Both the loading surface and the receptacle 34 can thus be observed by means of the camera also during unloading in order to, on the one hand, prevent a severe collision during the docking phase in particular in the case of a movement of the construction machine 2 and the transport vehicle 3 and in order to, on the other hand, let the material slide into the trough of the receptacle 34 at different speeds. This is of advantage in particular when the construction machine collects the material at different speeds.

The construction machine 2 according to FIGS. 8 to 11 also preferably comprises an evaluation unit 13 with an image-analysing programme 14. Furthermore, a transmission device 46, reception device 51 and a storage unit 52 are preferably specified. These have the same functions as already described for the construction machine according to FIGS. 1 to 7.

Just as the transport vehicle 3 according to FIGS. 1 to 7, the transport vehicle 3 may comprise a reception and display device 18 which may also comprise a transmission device 50 and a storage device 53. The functions are the same as the functions described according to FIGS. 1 to 7.

The entire loading and unloading process also requires a communication between the parties involved. For this purpose, message streams may be transmitted via the reception and display device 18 and/or the second transmission device 50 and the transmission and reception device 46, 51 arranged on the construction machine. Furthermore, it is advantageous if the message streams can be stored in one or both storage devices 52, 53.

On the screen 19, at least on one image 20, 21, reference images may be displayed which, for example, show the optimal position of the transport vehicle 3 relative to the construction machine 2. Said optimal position remains unchanged even when the transport vehicle 3 and the construction machine 2 move, since the optimal position of the transport vehicle, for example, during docking to the construction machine 2, remains unchanged from the perspective of the camera arranged at the construction machine 2. In the case of a strong deviation of the image 20, 21 from the displayed reference image, a message may be sent to the reception and display device 18 or a signal generated so that, for example, the horn 15 is sounded.

The invention claimed is:

1. A system comprising:
   a construction machine having a machine frame and a conveyor arranged to pivot at the machine frame; and
   an image-recording device comprising one camera aligned to provide a viewing angle comprising each of a loading space of a transport vehicle and at least a part of the machine frame;
   wherein data recorded by the image-recording device are transmitted to a reception and display device arranged at or in the transport vehicle, by means of a transmission device arranged at the construction machine.

2. The system of claim 1, wherein the recorded and transmitted data comprise image data.

3. The system of claim 1, wherein the image-recording device is also aligned towards the conveyor.

4. The system of claim 1, wherein the image-recording device is arranged at the conveyor.

5. The system of claim 4, wherein the image-recording device is pivotable relative to the conveyor to maintain an alignment relative to a ground plane and independent of an angle of inclination of the conveyor relative to the machine frame of the construction machine.

6. The system of claim 1, wherein the construction machine comprises a receptacle and the image-recording device is also aligned towards the receptacle.

7. The system of claim 1, wherein the camera records an image stream.

8. The system of claim 7, wherein the camera is : a video camera with a wide-angle lens, an infrared camera, a stereoscopic camera, or a PMD camera.

9. The system of claim 7, further comprising one or more of: at least one illuminant arranged at or next to the camera; and at least one mirror placed in a field of view of the camera wherein an observable area is selectively enlarged.

10. The system of claim 7, wherein the camera is arranged at an unmanned aerial vehicle.

11. The system of claim 1, wherein the image-recording device further detects a registration plate of the transport vehicle.

12. The system of claim 1, wherein the transmission device further transmits data to the reception and display device relating to a milling material.

13. The system of claim 1, wherein the transmission device further transmits messages from a driver of the construction machine to a driver of the transport vehicle comprising start or stop signals specified by the driver of the construction machine for the driver of the transport vehicle.

14. The system of claim 1, wherein the reception and display device comprises a second transmission device, and that a second reception device is arranged at the construction machine so that messages can be sent from a driver of the transport vehicle to a driver of the construction machine via the second transmission device.

15. The system of claim 1, further comprising an evaluation unit configured to evaluate the data of the image-recording device and determine one or more of: a filling level in the loading space; a distance between the construction machine and the transport vehicle; and a point of impingement of material in the loading space.

16. The system of claim 15, wherein the transmission device further transmits to the reception and display device data determined by the evaluation unit, said data determined by the evaluation unit comprising one or more of: start or stop signals for a driver of the transport vehicle; a mass of the loaded milling material; and a collision warning.

17. The system of claim 15, wherein the evaluation unit is configured to determine, as a function of a point of impingement of the material in the loading space and/or as a function of a distance between the construction machine and the transport vehicle, a start or stop signal which is transmitted to the reception and display device via the transmission device.

18. The system of claim 1, wherein the reception and display device is a portable computer.

19. The system of claim 1, further comprising a first storage device arranged at the construction machine, wherein the reception and display device comprises a second storage device, and wherein the data transmitted to the reception and display device is stored in one or more of the first storage device and the second storage device.

20. A method for displaying an image stream during the loading or unloading of a transport vehicle, the method comprising:
- recording images with an image-recording device mounted at a construction machine comprising a machine frame and a conveyor arranged to pivot at the machine frame, wherein the image-recording device is one camera aligned to provide a viewing angle comprising each of a loading space of the transport vehicle and at least a part of the machine frame; and
- transmitting, receiving and displaying the data recorded with the image-recording device on a reception and display device arranged at or inside the transport vehicle.

21. The method of claim 20, further comprising simultaneous displaying at least two subset image streams on a screen of the reception and display device, wherein each subset image stream contains a separate subset of images from the image stream.

22. The method of claim 20, further comprising determining an original position and/or alignment of the image-recording device is determined and, pursuant to a change in the position or alignment, displaying the image stream according to the original alignment.

23. The method of claim 20, further comprising specifying one or more of: at least one illuminant arranged at or next to the image-recording device; and at least one mirror placed in a field of view of the image-recording device wherein an observable area is selectively enlarged.

24. The method of claim 20, further comprising detecting a registration plate of the transport vehicle.

25. The method of claim 20, wherein data relating to a milling material is also transmitted to the reception and display device.

26. The method of claim 20, wherein messages from a driver of the construction machine to a driver of the transport vehicle are also transmitted to the reception and display device, said messages comprising start or stop signals specified by the driver of the construction machine for the driver of the transport vehicle.

27. The method of claim 20, wherein messages are sent by a driver of the transport vehicle to an operator of the construction machine.

28. The method of claim 20, further comprising:
- determining data comprising one or more of: start or stop signals for the driver of the transport vehicle; a mass of the loaded milling material; and a collision warning; and
- transmitting the determined data to the reception and display device in addition to the data recorded by the image-recording device.

29. The method of claim 28, further comprising storing the data recorded by the image-recording device, and/or the determined data, in a first storage device arranged at the construction machine, and/or in a second storage device arranged at the reception and display device.

30. The method of claim 20, further comprising evaluating the image data and determining one or more of: a filling level in the loading space; a distance between the construction machine and the transport vehicle; and a point of impingement of material in the loading space.

31. The method of claim 30, wherein a start or stop signal is determined as a function of the point of impingement of the material in the loading space and/or as a function of the distance between the construction machine and the transport vehicle, and further transmitted to the reception and display device.

32. The method of claim 20, wherein the reception and display device is a portable computer.

33. The method of claim 20, wherein an image stream is displayed on no less than two screens.

34. The method of claim 20, wherein an image stream is displayed on multiple compact portable computers.

35. The method of claim 20, further comprising displaying a reference image on a screen of a compact computer and generating a signal responsive to a specified deviation of the image stream from the reference image.

36. A system comprising:
- a construction machine having a machine frame, a conveyor arranged to pivot at the machine frame, and a first computing device arranged thereon;
- an imaging device comprising one camera aligned to provide a viewing angle comprising each of a loading space of a transport vehicle and at least a part of the machine frame, wherein the imaging device is in operable communication with the first computing device;
- a second computing device associated with a driver of the transport vehicle and having a programmed mobile application residing thereon, wherein at least image data corresponding to images captured by the camera are transmitted to the second computing device via the first computing device and a wireless transmission medium and displayed on a display unit of the second computing device.

37. The system of claim 36, wherein the at least image data transmitted to the second computing device comprises subset image streams for different locations associated with the transport vehicle, said subset image streams being displayed on the display unit of the second computing device.

38. The system of claim 37, wherein the displayed subset image streams comprise selectively generated indicators associated with a collision between the construction machine and the transport vehicle as predicted by the first computing device.

39. The system of claim 36, wherein the camera is pivotable along with and in a direction of the conveyor with respect to the loading space, and further configured to maintain an alignment of the camera relative to a plane of the ground and independent of an angle of inclination of the conveyor relative to the machine frame of the construction machine.

* * * * *